Patented June 1, 1926.

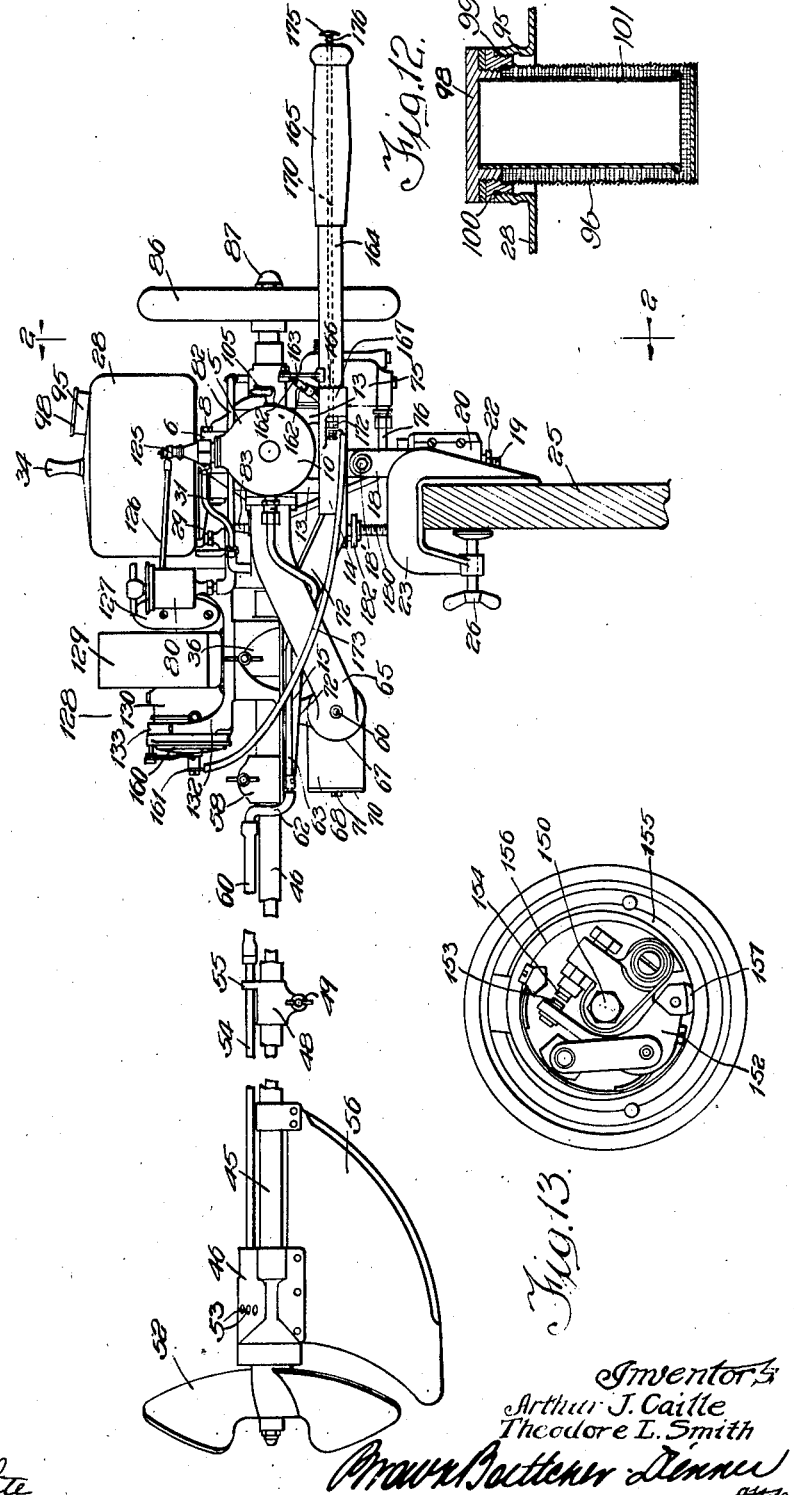

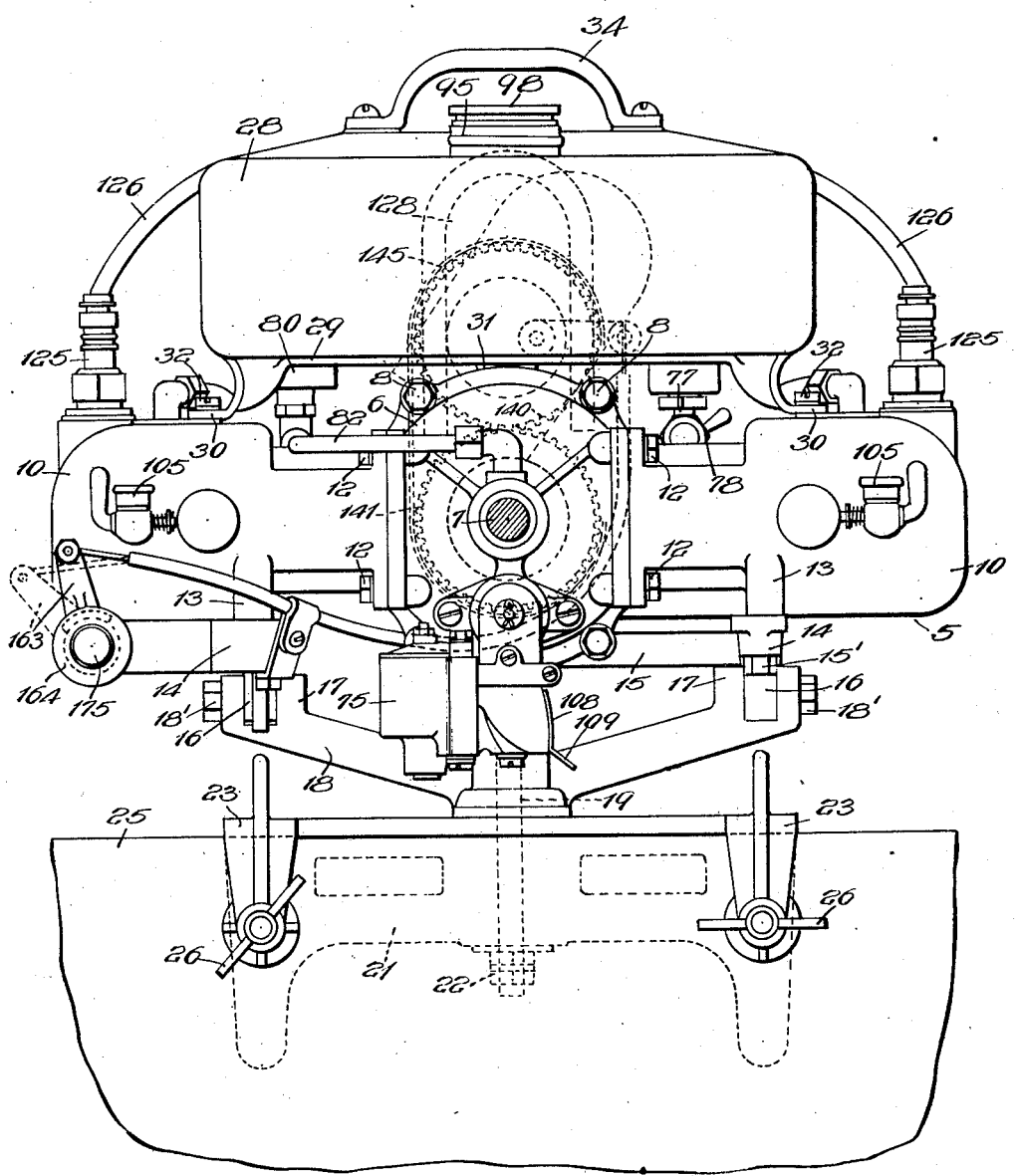

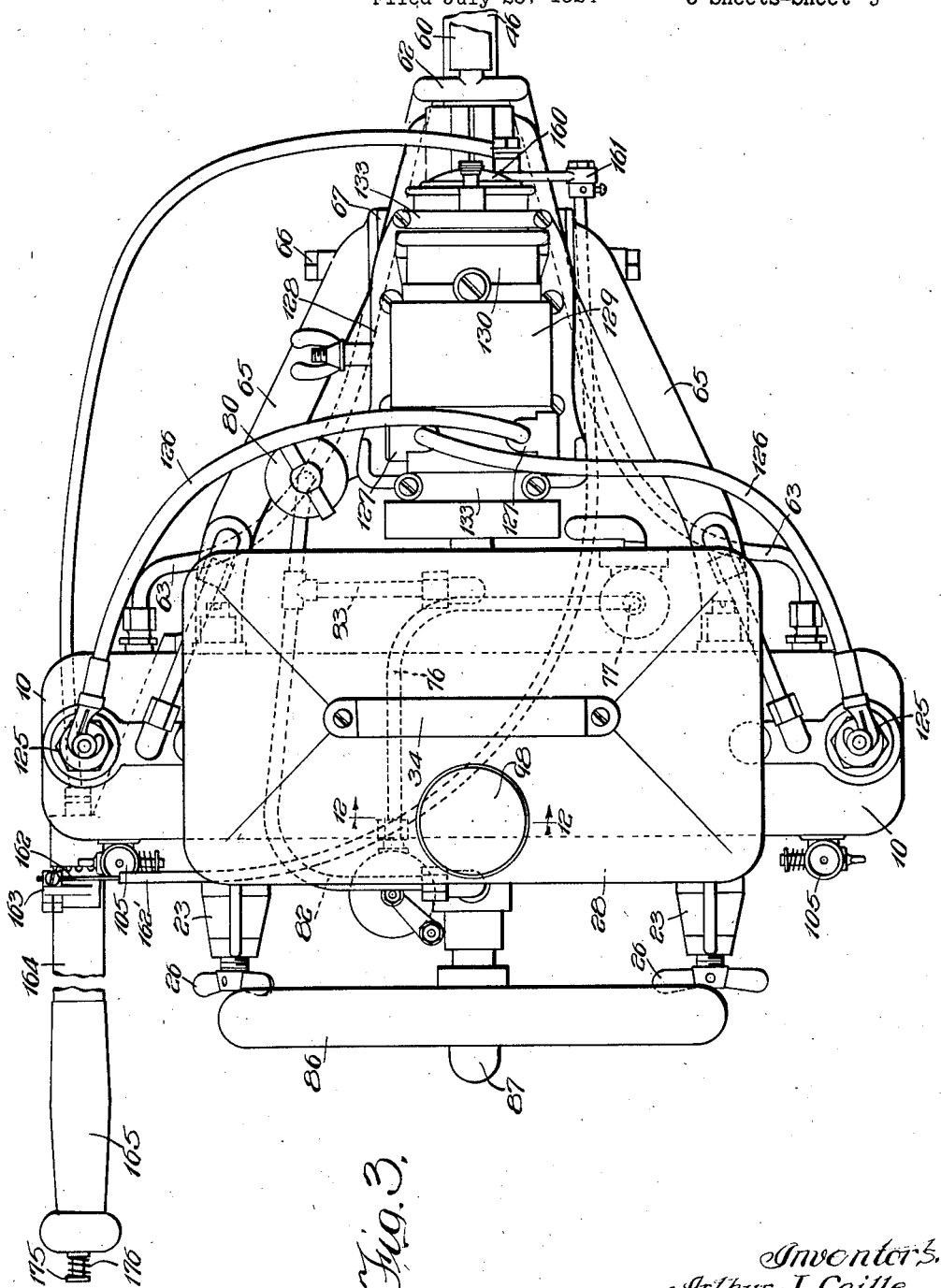

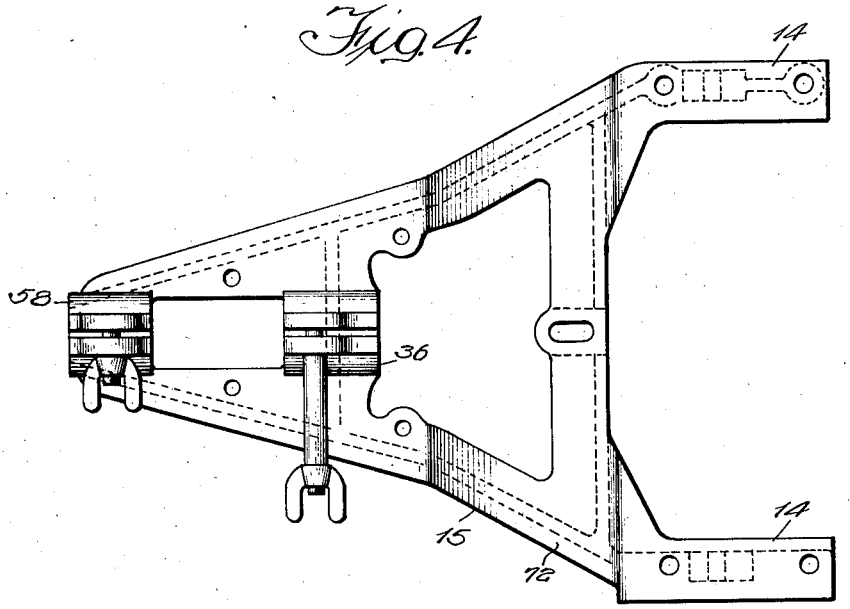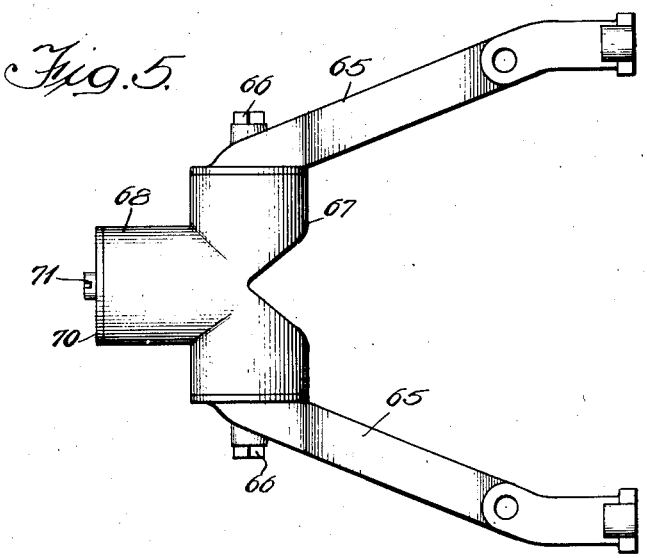

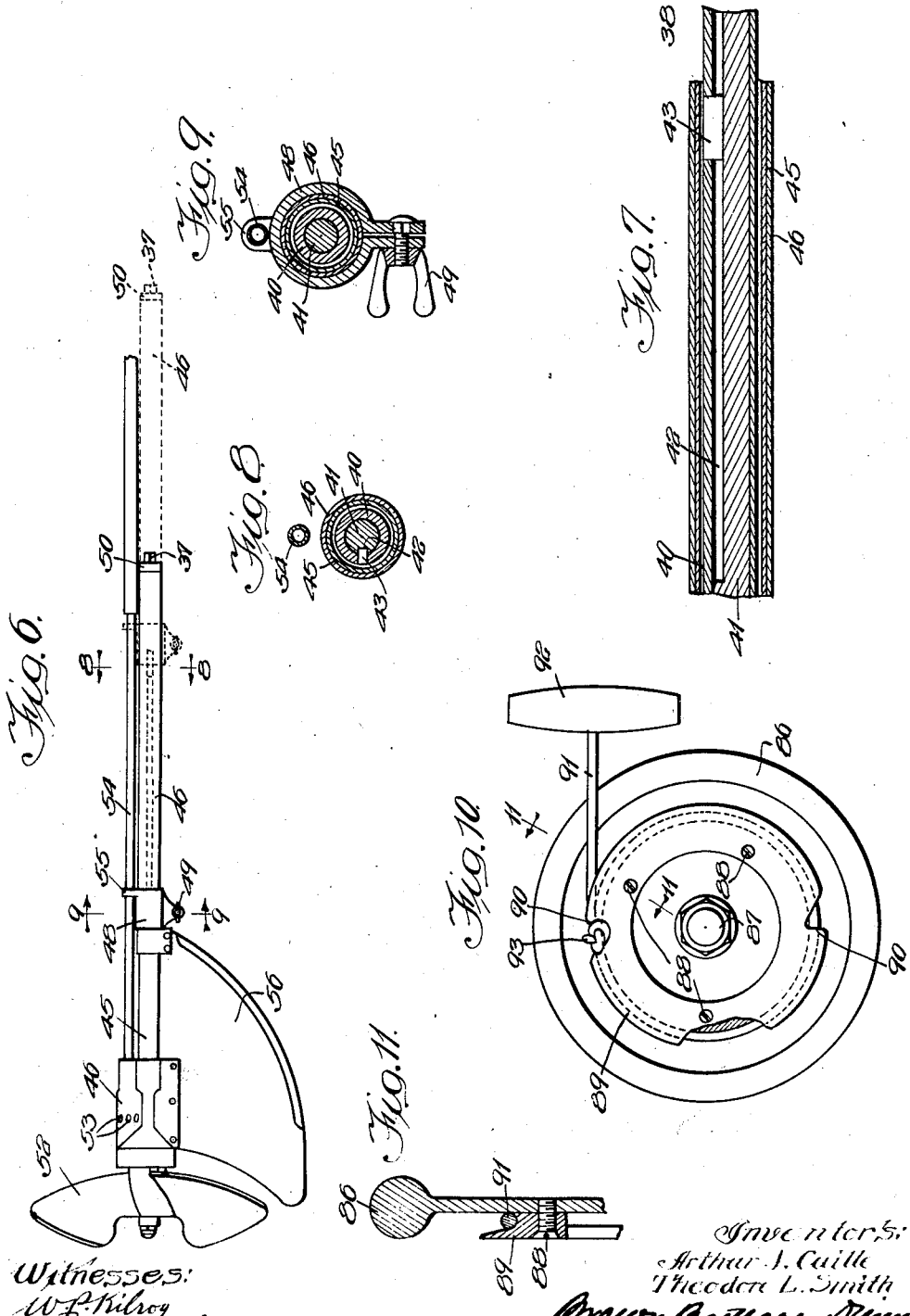

1,586,517

UNITED STATES PATENT OFFICE.

ARTHUR J. CAILLE AND THEODORE L. SMITH, OF DETROIT, MICHIGAN.

MARINE MOTOR.

Application filed July 23, 1924. Serial No. 727,620.

This invention relates to marine motors and more particularly to marine motors of the so-called outboard or portable type for small craft,—row-boats, canoes, and the like.

Whereas, in our prior Patent No. 1,479,025, of January 1, 1924, we have disclosed a single cylinder motor of the present class characterized by its direct drive to the propeller, its mounting in a universally supported cradle with novel provisions for tilting to facilitate clearing obstructions and beaching, and for swinging the motor laterally for steering, its improved cooling pump in which the shock and lines of vibration are minimized, its improved spark controlling provisions and the compact, balanced arrangement of the parts, and low center of gravity, and the peculiar adaptability of the arrangement of the parts for operation in starting, stopping and maneuvering the boat, and in carrying or transporting the motor, the present application is directed to an improved two or multiple cylinder motor and to certain improvements in motors of this general class, whether of the single or multiple cylinder type.

The present invention provides an improved double or multiple cylinder motor in which an excellent balance is secured in operation and for ease in carrying or transporting. The arrangement of the parts is especially suited for ease and convenience in starting, stopping and maneuvering the boat, and for ease and convenience in carrying transporting the motor, and the device has a low center of gravity and is exceedingly compact and conveniently accessible, yet not subject to the action of the water. An improved combination propeller shaft and cooling tube is provided, and by making this combination detachable as a unit and the propeller collapsible or telescoping, its length may be decreased for convenience in carrying and transporting, and as conveniently increased to the desired operating length for use.

An improved swinging or tilting mounting of the magneto upon the cradle or motor mounting with improved operating connections between it and the handle for swinging the magneto by rotation of the handle grip, provides an improved adjustment for adjusting or timing the spark to control the speed of the motor. The handle extends forwardly from the front of the motor, and the correlation between it and the magneto, together with the operating connections therebetween, permits a disposition of the magneto which lends itself admirably to the balanced and compact relation of the parts.

A balanced disposition of the fuel tank is provided and a carrying arrangement in connection with said tank provides a balanced application of the carrying stresses and thereby facilitates carrying and transporting the motor when not in use. The exhaust manifold lends itself to the compact disposition of the parts without impairing maximum effectiveness in discharging the exhaust gases from the engine. A notched reel on the fly wheel with a detachable flexible element is provided for convenience in producing the amount of turning over of the engine usually required to start it, where a magneto is employed. A common grease cup is provided for the main crank shaft bearings, and the gasoline tank has a novel filler cap for introducing cylinder oil into the fuel.

In order to acquaint those skilled in the art with the manner of constructing and operating a motor embodying our present invention, we shall now describe, in connection with the accompanying drawings a particular embodiment of the invention.

In the drawings:—

Fig. 1 is a side elevational view of a motor embodying the invention.

Fig. 2 is an enlarged front view taken just rearwardly of the fly wheel on line 2—2 of Fig. 1;

Fig. 3 is a top plan view of the motor with the rearwardly extending propeller shaft broken away;

Fig. 4 is a top plan view of the engine cradle;

Fig. 5 is a top plan view of the exhaust manifold;

Fig. 6 is a side elevational view of the propeller shaft and water tube showing the propeller shaft in extended position in dotted lines and the propeller, protecting fin or skeg and water pump associated therewith;

Fig. 7 is a fragmentary longitudinal section showing the driving connection between the telescoping propeller shaft sections;

Fig. 8 is a detailed cross-section on line 8—8 of Figure 6;

Fig. 9 is a detailed cross-section on line 9—9 of Figure 6;

Fig. 10 is a rear view of the fly wheel showing the notched disc and cooperating flexible element for turning over the engine;

Fig. 11 is a fragmentary detailed section on line 11—11 of Fig. 10.

Fig. 12 is a detailed section on line 12—12 of Fig. 3 through the filler opening of the fuel tank and the co-operating filler cap; and Fig. 13 is a rear view of the magneto with the cap removed to show the interrupter parts.

Referring to the drawings, 5 designates in its entirety the driving motor, which is of the 2-cycle internal combustion type. It has a centrally disposed crank case 6 and a longitudinally extending crank shaft 7. The crank case 6 is divided centrally on a plane at right angles to the axis of the crank shaft 7 into two parts which are fastened together by bolts 8. The engine 5 has two 180 degree or diametrically opposite cylinders 10 which open into the centrally disposed crank case 6 and are fastened thereto by bolts 12.

Operating in the diametrically opposite cylinders 10 are two 180 degree or diametrically oppositely acting pistons (not shown), which pistons are connected to the crank shaft 7 through two 180 degree or diametrically opposite crank arms so that both pistons move outwardly on their suction stroke together and inwardly on their power stroke together, the charges within the cylinders being fired together by suitable spark producing to be hereinafter described. This disposition of the engine cylinders and action of the pistons provides a balanced action in operation, permitting relative great power with a minimum of vibration and rocking of the boat. At the same time fuel supply to the cylinders and the ignition of the charges in the cylinders is simplified.

The cylinders 10 lie in a generally horizontal plane, one on each side of the central longitudinally extending crank shaft 7, and each cylinder is provided with vertically disposed mounting posts 13 which engage upon the inwardly extending parallel arms 14 of the generally V-shaped frame or cradle 15 upon which the engine is bolted by bolts which extend up through the arms 14 and are threaded into suitably tapped holes in posts 13. These bolts, one of which is shown at 15′ in Fig. 2, secure the engine rigidly in place upon the cradle. Arms 14 have depending lugs 16 which project downwardly into the upwardly projecting bifurcated ends 17 of a yoke member or transverse clamping base 18. Suitable pins or bolts 18′ pivotally mount the cradle 15 on the yoke 18 for tilting or transverse clamping base 18 for tilting or swinging movement in a vertical plane.

The transverse clamping frame 18 is mounted upon a post 19 for swinging or pivotal movement in a horizontal plane about the upper end of the post 19. The post 19 is journaled in a split hub 20 formed integral with a mounting bracket 21 and engages at its lower end in a nut 22. The opposite ends of the bracket 21 are provided with clamps 23 for attaching the motor to the stern board of the boat or other suitable board or frame arranged to receive same. The clamps 23 are of U-formation for arrangement over the stern board 25, for example, and are provided with suitable screws 26 for securely and rigidly attaching the bracket in place.

The tank for carrying the gasoline or other fuel is designated at 28 and suitably secured to its bottom is a mounting base or bracket 29 provided adjacent opposite cylinders 10 with mounting feet or lugs 30 (Fig. 2), and at its rear with an intermediate mounting foot or lug 31 (Fig. 1 and Fig. 2). The fuel tank 28 lies in a general horizontal plane over the crank case 6 and inner ends of cylinders 10. The mounting feet 30 are fastened directly to the cylinder walls 10 by set screws or bolts 32 and the mounting foot 31 is similarly fastened to the crank case 6 adjacent the rear thereof.

A handle 34 secured centrally to the upper wall of the tank 28 is provided for carrying the motor to and from the boat or otherwise transporting the same from place to place. It should be noted that this carrying handle 34 lies above and generally in the vertical plane of crank shaft 7 and that the mounting frame, cradle, crank case, engine cylinders, fuel tank, propeller shaft, and other parts of the motor, are balanced to a nicety with respect thereto. This greatly facilitates and makes for ease in carrying the motor from place to place because of the balanced disposition of the weight and mass with respect to the lifting and carrying effort.

The mounting and disposition of the engine cylinders and other parts accompanying the twin cylinder construction provides an excellent balance which is essential in connection with the craft with which motors of this type are adapted for use. At the same time, the entire motor is positioned for convenient access and away from the water sufficiently, so that it will not ordinarily be subject to the action thereof. The mounting bracket, transverse clamping base, and engine cradle, are of the general type disclosed and claimed in our above referred to prior patent, and, as in that case, the vertical post or king pin 19, together with the pins or bolts 18′ provide a universal joint connection between the bracket 21 and the engine cradle.

One end of the engine shaft or crank shaft 7 projects rearwardly from the engine and terminates when the engine is mounted on the cradle 15 in the forward end of a split clamping sleeve 36 formed integral with the cradle 15, as shown in Fig. 4. The rear end of the crank shaft 7 in the sleeve 36 or just forwardly thereof, is provided with a squared or non-circular socket for the reception of a correspondingly formed end 37 on the removable propeller shaft 38. The insertion of the squared or non-circular end 37 of the propeller shaft into the correspondingly formed socket in the crank shaft connects the propeller shaft for rotation with the crank shaft of the engine.

To secure compactness and thereby ease and facility in carrying and transporting the propeller shaft and water tube unit when said unit is removed from the motor, we make the propeller shaft of telescoping formation so that it may be retracted and its length shortened when detached from the motor and lengthened to the desired operating length for attachment to the motor.

To this end the propeller shaft comprises a pair of telescoping sections, such as for example, a rear sleeved section 40 which telescopes over a forward shaft section 41 (Fig. 7). The shaft 41 has, for example, a longitudinal groove 42, and a key 43 on the sleeved section engages in said groove and drivingly connects the two propeller shaft sections at all times, particularly when said sections are in extended or operating position. The extended position of the propeller shaft is shown in dotted lines in Fig. 6. The amount of extension may be limited by engagement of the key 43 with one end of the slot 42, as shown in Fig. 7, or it may be limited by the provision of a collar or other suitable stop means between the two propeller shaft sections.

A pair of telescoping tubes 45 and 46 enclose the propeller shaft sections 40 and 41. The rear end of the rear tube 45 is secured in a pump body 46, as shown in Fig. 6, and the rear end of the forward tube 46 telescopes over the tube 45 and is provided at its rear end with a split clamp 48 having a thumb nut 49 which is adapted to be clamped to the tube 45 to clamp the propeller tubes and thereby the propeller shafts in retracted position, as shown in full lines in Fig. 6. By loosening the thumb nut 49, the tube 46 may be slipped forwardly on the tube 45 to position the propeller tubes and thereby the propeller shaft section, the forward one of which is secured in a head 50 at the forward end of tube 46, in the extended operating position, as shown in dotted lines in Fig. 6, the nut 49 being again tightened to clamp or lock the propeller shaft extended.

The rear propeller shaft section extends rearwardly through the pump body 46 and carries a propeller wheel 52 suitably fixed thereon for rotation therewith. The pump 46 is for supplying water to the water jacket of the engine, as will be pointed out, and is preferably of the type more fully disclosed in our hereinbefore referred to prior patent. Briefly, the body of the pump has inlet ports 53 through which the water enters the pump body as a plunger reciprocable longitudinally of the propeller shaft by the rotation of the propeller 52 is forced outwardly beyond said ports 53. As the pump plunger moves inwardly or forwardly, the water admitted through the ports 53 is forced through the water tube 54 to the water jacket of the engine. The water tube 54 is of generally fixed length substantially equal to or somewhat shorter than the retracted length of the telescoping propeller. The clamp 48 has a lateral apertured lug 55 which fits over the water tube and thereby guides the propeller tube 46 in its telescoping movement. A downwardly extending fin or skeg 56 integral with the pump body 46, serves as a rudder and also to protect the propeller 52.

To connect the propeller shaft with the engine or crank shaft, the tube 46 with the forward propeller shaft section retained against longitudinal displacement therein, in the head 50 as already pointed out, is inserted through split sleeves or hubs 58 and 36 on cradle 15, and the end 37 into driving engagement with the socket in the crank shaft. The thumb screws with which clamps or split sleeves 36 and 58 are provided, are then tightened up to clamp the sleeves 36 and 58 securely upon the tube 46 to hold the same in place and against possible loosening. The rear end of the crank shaft may be mounted in a suitable bearing or of slightly less diameter than the tube 46 to prevent possible clamping of the crank shaft and thereby the propeller shaft against rotation. A thrust bearing is also preferably provided between the forward end of the propeller shaft tube and the adjacent end of the crank case but to insure free action of the propeller shaft at that point. Loosening of the clamps 36 and 58 permits disconnecting of the propeller shaft, water tube, propeller and other mechanism associated therewith as a unit from the motor.

The forward end of the water tube 54 is adapted to be connected through a suitable rubber hose or flexible length of tubing 60 with a forked coupling tube 62 which straddles the propeller shaft just rearwardly of the clamp 58, and its two depending arms are connected through tubes 63 with the water jackets of the respective cylinders 10. It should be noted in Fig. 1 that one tube 63 extends along each side of the rear V-shaped portion of cradle 15 down around the exhaust manifold, to be hereinafter described, and up to and is connected with the water jacket of the cylinder through a suitable coupling.

The exhaust manifold for discharging the exhaust gases from the engine comprises a pair of exhaust tubes 65 which are bolted at their forward ends over the exhaust ports of the respective cylinders and are inclined downwardly and converge rearwardly, as shown in Figs. 1 and 3. Secured between the rear ends of the exhaust tubes 65, as by means of a bolt 66, is a T-shaped muffler 67 (Fig. 5). The base of the muffler 67 opens at its opposite ends into the exhaust tubes 65 and the rearwardly extending portion 68 discharges the exhaust gases rearwardly through an apertured plate 70 which is secured over the rear open end of the muffler, as by a bolt 71.

It should be noted that the cradle 15 of the present device is offset at 72 and that the exhaust manifold straddles the engine cradle and leads the exhaust gases from the engine at a point above the cradle and discharges them from the muffler below the cradle and generally in the vertical plane of the crank shaft of the engine. The resulting manifold arrangement makes for compactness and lends itself to the balanced disposition of the parts of the motor. The base of the muffler is bolted or otherwise attached at 72 to the cradle 15.

The engine is supplied with combustible mixture from a carburetor 75 (Fig. 2), bolted to the forward wall of crank case 6 and opening into the crank case below the crank shaft and in the vertical plane thereof. The carburetor is supplied with fuel from the tank 28 by means of a tube 76 which leads from the bottom of tank 28 at 77 (Fig. 2), and is provided there with a suitable drain cock 78 and the opposite end of the tube 76 leads into the bottom of the carburetor through a suitable coupling as shown in Fig. 1.

One main grease cup 80 is provided for lubricating both main bearings of the engine. This cup is connected through tubes 81 and 82, as shown in dotted lines in Fig. 3, with the main engine bearings, and it should be kept filled with grease, and when the engine is running it should be given a turn ever so often to supply lubricant to the bearings.

Fixed upon the forward end of the crank shaft and disposed centrally with respect to the engine cylinders, crank case, and fuel tank, is a fly wheel 86. Longitudinal displacement of the fly wheel is prevented by means of a suitable nut 87, mounted upon the forward face of the fly wheel, as by means of screws 88, is a disc 89. This disc 89 forms a reel between it and the fly wheel, as shown in Figs. 10 and 11, and the periphery of the disc is notched at 90. A flexible element in the form of a heavy cord or rope 91, having a handle 92 at one end, is knotted at 93 at its opposite end and the knot 93 is adapted to be engaged in any of the notches 90, the flexible element wrapped around the reel between the disc and fly wheel in the proper direction, and the flexible element given a quick pull to pull the fly wheel and crank shaft against compression, whereupon, ignition suddenly reverses the motion and turns the engine over in the proper direction. The flexible element is thereby in the nature of a cranking element and makes for great ease and convenience in turning over the motor to start the same, particularly in spinning the motor which is desirable when a magneto is employed. Of course where spinning of the motor is not required the fly wheel may simply be rocked back and forth to fill the cylinders with gas and then by placing his hand and arm under the fly wheel, gripping it and pulling against compression, the motor may be conveniently started by the operator.

The fuel tank 28 has a filler opening 95 provided with a filter 96 (Fig. 12) and a filler cap 98 is provided for closing said opening. The filler opening is threaded at 99 and the cap has threads 100 cooperable with the threads 99, and, in addition, is provided with an integral filler cup 101 which lies inverted in the filler opening when the cap is in place. The cup 101 is adapted for measuring and pouring cylinder oil into the gasoline, six of said cups of standard cylinder oil being preferably used to one gallon of gasoline in the embodiment shown. Each cylinder 10 is preferably provided with a suitable laterally disposed priming cup 105, as shown in Fig. 2. To close off the air supply to the carburetor, that is, choke the carburetor in starting, it is provided with a choke valve 108 pivoted at its upper end and provided at its lower end with a finger piece 109 which is centrally disposed to the rear of the fly wheel and thereby conveniently accessible to the operator with the other parts in starting the motor.

Each engine cylinder 10 is provided with a spark plug 125 and these spark plugs 125 are connected by suitable conductors 126 with the brush holders 127 of a magneto 128. The magneto 128 has the magnet 129 and the magneto frame 130 which is mounted for rocking or tilting movement in a cradle 132 by clamping straps 133. The forward end of the magneto shaft has a gear 140 which meshes with a gear 141 (Fig. 2) on the crank shaft just forwardly of the cradle clamp 36, and drivingly connects the magneto shaft with the crank shaft. A guard 145 carried by the magneto cradle 132 surrounds the meshing gears 140 and 141. The magneto shaft 150 (Fig. 13) carries an interrupter lever 152 which has a contact 153 which normally engages a cooperating contact 154. The interior of the surrounding interrupter cam carried by the frame 130 is eccentric or has a raised portion 156 which in the rotation of the lever 152 cooperates with the block 157 thereon and separate the contacts 153, 154, thereby controlling the brush contacts and producing a spark simultaneously in both of the engine cylinders.

The magneto frame has an end cap 160 provided with an integral projecting arm 161 to which one end of an operating wire 162 is connected. The wire 161 is trained through a tube 162' to and is connected at its opposite end with a lug 163 projecting laterally from the steering handle 164. The steering handle 164 has a suitable grip 165 and the forward end of said sleeve is serrated at 166 for engagement with serrations in the mounting piece 167 to hold the handle sleeve against rotation. A rod 170 extends through the handle sleeve and has a contact button 172 at its rear end which is connected by a conductor 173 with the magneto. The opposite end of the rod 170 has a button 175 between which and the grip 165 a coiled spring 176 is interposed. This spring 176 normally holds the serrations 166 in engagement and the contact button 172 in grounded contact with the mounting piece 167.

By pulling or withdrawing the handle sleeve forwardly, it may be turned in either direction and this turning is transmitted through the wire 161 and magneto cap 160 to the magneto frame, and turns the entire magneto bodily or rocks it in its cradle to change the position of the raised cam portion 156, and thereby the timing of the magneto to advance or retard the spark. The ignition system is broken and the spark supplied to the engine cylinders stopped by pressing the button 175 to move the contact button 172 out of grounded contact with frame piece 167.

The arrangement of the magneto to the rear of the engine and in the vertical plane of the crank shaft, lends itself admirably to the balancing of the motor and the forwardly extending handle 165 with the operating connections between it and the magneto for rocking or swinging the entire magneto bodily, provides for great ease and convenience in timing the spark. The arrangement of the two engine cylinders, the fuel tank, the magneto, fly wheel, carburetor, control handle and other parts are peculiarly adapted for the purpose for which the device is provided. The handle bar 165 performs the function of a steering handle for tilting the propeller laterally or swinging the same up and down and, in addition, it performs the function of a spark control through its operating connections for swinging or rocking the magneto. It is placed at the right hand side of the engine cradle, looking forward. The gasoline shut-off valve on the bottom of the tank and the arrangement of the carburetor, permits convenient opening of the shut-off valve and closing of the carburetor choke in starting the motor. In starting, the operator usually turns about three-quarters of the way around from normal position, that is, almost facing the fly wheel, and places his left hand upon the steering and spark control lever, and with his right hand may open the gasoline shut off and close the choke and then rock the fly wheel back and forth, and when the cylinders are full of gas, either through priming or through this rocking, he may conveniently place his arm and hand under the fly wheel or by means of the cranking element already described, turn the engine over, whereupon, ignition suddenly reverses the motion and turns the engine over in the proper direction. At the same time, it is highly desirable that the spark be advanced in order that the starting may not be lost, and when the motor has run for a moment, it is desirable to open the choke. He is able to do this by turning the wrist of the left hand to rock the magneto, and with his right hand open the choke and secure proper running of the engine, all without changing his position or changing his hands, which it might be difficult to do quickly enough to save the start of the engine.

The means for adjusting the inclination of the motor and propeller shaft, comprises an adjusting screw 180 provided with a suitable nut 182, and this means is substantially the same as more fully disclosed in our hereinbefore referred to prior patent and will not be described in detail here.

We do not intend to be limited to the particular details shown and described nor to an embodiment of the invention in a two or multiple cylinder motor.

We claim:—

1. In a device of the class described, a transverse clamping base, a longitudinal motor cradle, a universal joint connection between said base and said cradle, a motor mounted upon said cradle, said motor having a pair of generally horizontal oppositely disposed cylinders and its crank shaft extending longitudinally of the cradle and lying centrally between said cylinders, a fly wheel at the front end of the crank shaft, a propeller shaft extending rearwardly in line with the crank shaft, spark controlling means mounted for swinging movement on the motor cradle rearwardly of the motor, a handle extending parallel to the crank shaft and rigidly connected to the motor, said handle extending forwardly at the side of the fly wheel, and a sleeve on the handle connected to said spark controlling means for swinging said means to advance or retard the spark.

2. In a device of the class described, a transverse clamping base, a longitudinal engine cradle, a universal joint connection between said base and said cradle, an engine mounted on said cradle with its crank shaft extending longitudinally, a propeller shaft extending in line with the crank shaft, said engine having a pair of generally horizontal oppositely disposed cylinders, a fly wheel at the front end of the crank shaft, a fuel tank mounted upon the engine cylinders and lying generally horizontally thereabove, and a carrying handle on said fuel tank in the vertical plane of the crank shaft.

3. In a device of the class described, a transverse clamping base, a longitudinal engine cradle, a universal joint connection between said base and said cradle, an engine mounted upon said cradle, said engine having a pair of generally horizontal oppositely disposed cylinders and its crank shaft extending longitudinally of the cradle and lying centrally between said cylinders, a fly wheel at the front end of the crank shaft, a propeller shaft extending rearwardly in line with the crank shaft, spark controlling means mounted for swinging movement on the engine cradle rearwardly of the motor, a handle connected to the motor and extending forwardly at the side of the fly wheel, a connection between said handle and the spark controlling means for swinging said means to advance or retard the spark, a fuel tank mounted upon the engine cylinders and lying generally horizontally thereabove, and a carrying handle on said fuel tank in the vertical plane of the crank shaft.

4. In a device of the class described, a supporting base, a motor mounted thereon, said motor having a crank shaft, and a generally horizontally disposed cylinder, a fuel tank mounted upon the motor and lying generally in a horizontal plane directly over said cylinder, and a carrying handle on said fuel tank for applying a carrying effort substantially vertically above the crank shaft.

5. In a device of the class described, a transverse clamping base, a longitudinal engine cradle, a universal joint connection between said base and said cradle, an engine mounted upon said cradle, a magneto supporting base mounted on the engine cradle rearwardly of the engine, a magneto mounted for swinging movement on said magneto supporting base, and a forwardly extending handle connected to said magneto to swing it in its cradle to advance or retard the spark.

6. In a device of the class described, a frame, an engine carried thereby, said engine having a crank shaft, a propeller shaft, a tube for said propeller shaft, means for securing said propeller shaft and said tube together for removal as a unit from the engine, a clamp carried by the frame and adapted for clamping the propeller shaft and tube in line with the engine shaft with the propeller shaft in driving engagement therewith, a magneto mounted upon the engine frame above said clamp, and a driving connection between the crank shaft and the magneto forwardly of said clamp.

7. In a device of the class described, an engine cradle, an engine mounted thereon, said engine having oppositely disposed cylinders lying in a generally horizontal plane, and a generally longitudinal crank shaft, a muffler opening rearwardly beneath the rear of said cradle, and exhaust manifold means connected to the engine above the cradle and attached to and opening out through said muffler below the cradle.

8. In a device of the class described, an engine cradle, an engine mounted thereon, said engine having oppositely disposed cylinders lying in a generally horizontal plane and a V-shaped exhaust manifold straddling the cradle, and said manifold leading from the engine above the cradle and discharging rearwardly below the rear of the cradle.

9. In a device of the class described, the combination of an engine frame and a V-shaped exhaust manifold, one straddling the other, and an engine mounted upon the frame, said engine opening into the exhaust manifold on one side of the frame and the exhaust manifold discharging the exhaust gases on the other side of the frame.

10. In a device of the class described, a detachable propeller shaft and water tube unit comprising a water tube of generally fixed length, and a telescoping propeller shaft adapted to be retracted to substantially the length of the water tube for carrying and transporting and to be extended to a greater operating length.

11. In a device of the class described, a detachable propeller shaft and water tube unit comprising a water tube of generally fixed length, a telescoping propeller shaft adapted to be retracted to substantially the length of the water tube for carrying and transporting and to be extended to a greater operating length, a propeller tube for the propeller shaft, said propeller tube comprising a relatively fixed section, and a telescoping section guided by the water tube.

12. In a device of the class described, a detachable propeller shaft and water tube unit comprising a water tube of generally fixed length, a telescoping propeller shaft adapted to be retracted to substantially the length of the water tube for carrying and transporting and to be extended to a greater operating length, a propeller tube for the propeller shaft, said propeller tube comprising a relatively fixed section, a telescoping section guided by the water tube, and clamp means on the telescoping tube section for securing the propeller shaft and tube in extended position.

13. In a device of the class described, a detachable propeller shaft comprising telescoping sections adapted to be retracted for carrying and transporting, and to be extended for use, means for securing said sections in extended position, and means connecting said sections for rotation together when extended.

14. In combination, a pump body, a propeller tube secured thereon and extending forwardly therefrom, a water tube secured in the pump body and extending forwardly generally parallel with said propeller tube, telescoping propeller shafts one extending through said propeller tube and through the pump body and carrying a propeller rearwardly thereof, a propeller tube for the other propeller shaft, said last tube telescoping upon said first propeller tube, means on said last tube for guiding it on the water tube and for securing the propeller tubes and shafts in extended position, and means connecting the propeller shafts for rotation together when extended.

15. In a device of the class described, a propeller shaft comprising a pair of telescoping shaft sections, means for connecting said sections for rotation together, a telescoping propeller tube enclosing said sections, and means on said telescoping propeller tube for securing the tube and shaft sections in extended position.

16. The combination with a motor having a driving shaft, of a propeller shaft adapted for driving engagement with said driving shaft, and detachable therefrom, said propeller shaft comprising telescoping sections adapted for retraction when detached from the motor to facilitate carrying and adapted to be extended for use.

In witness whereof, we hereunto subscribe our names this 10 day of June, 1924.

ARTHUR J. CAILLE.
THEODORE L. SMITH.